United States Patent
Maughan

(10) Patent No.: US 6,371,682 B1
(45) Date of Patent: Apr. 16, 2002

(54) ANCHOR POST NON-ARTICULATING IDLER SOCKET JOINT

(75) Inventor: Garth B. Maughan, Delta, OH (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/579,647

(22) Filed: May 26, 2000

(51) Int. Cl.[7] .............................................. F16C 11/00
(52) U.S. Cl. .................. 403/165; 403/147; 280/93.508
(58) Field of Search .................. 403/164, 165, 403/140, 135, 137, 147, 134, 136, 138, 122; 280/675, 93.508, 93.509, 93.507, 93.502, 93.511

(56) References Cited

U.S. PATENT DOCUMENTS

| | | | | |
|---|---|---|---|---|
| 2,827,303 A | | 3/1958 | Herbener | 280/96 |
| 2,880,026 A | * | 3/1959 | Moskovitz | 403/137 |
| 2,937,033 A | | 5/1960 | Herbener | 280/95 |
| 2,944,829 A | | 7/1960 | Herbener | 280/95 |
| 3,044,798 A | * | 7/1962 | Gerner | 280/93.509 |
| 3,112,123 A | | 11/1963 | True | 280/95 |
| 3,210,108 A | | 10/1965 | Herbenar | 287/93 |
| 3,361,459 A | | 1/1968 | Marquis et al. | 287/93 |
| 3,369,848 A | * | 2/1968 | Gerner | 280/93.508 X |
| 3,434,763 A | * | 3/1969 | Gerner | 280/93.508 X |
| 3,495,859 A | * | 2/1970 | Hassan | 403/145 |
| 3,667,789 A | * | 6/1972 | McNeely et al. | 403/128 |
| 3,945,737 A | | 3/1976 | Herbenar | 403/27 |
| 3,951,557 A | * | 4/1976 | Herbenar | 403/138 |
| 4,101,227 A | | 7/1978 | Herbenar et al. | 403/27 |
| 4,154,546 A | * | 5/1979 | Merrick et al. | 403/134 |
| 4,765,770 A | * | 8/1988 | Buhl | 403/147 X |
| 5,607,249 A | | 3/1997 | Maughan | 403/165 |
| 6,146,045 A | * | 11/2000 | Maughan | 403/165 |

* cited by examiner

Primary Examiner—Harry C. Kim
(74) Attorney, Agent, or Firm—Rader, Fishman & Grauer PLLC

(57) ABSTRACT

A non-articulating joint assembly is disclosed having a bracket with a first generally cylindrical end that is received in a split-half bearing assembly that has a tapered outer surface. The tapered split-half bearing assembly matingly engages a tapered bore in the first housing of a socket. The tapered split-half bearing is slightly larger than the tapered inner bore to provide a radial pre-load on the assembly bearing. A cap bearing is located in the housing and engages the bottom surface of the tapered split-half assembly bearing. A closure member is located below the cap bearing and cooperates with a spring member and a rim of the first housing that is crimped over to securely hold the components in position and also provide an axial pre-load on the split-half bearing. Similarly, a second housing on the socket member has a second split-half bearing assembly and a second cap bearing assembly that receives a stud is provided. The stud includes a generally cylindrical end portion. The assembly of the components in the second housing is similar to the first housing. Thus, looseness and end play in the joint assembly is eliminated.

17 Claims, 4 Drawing Sheets

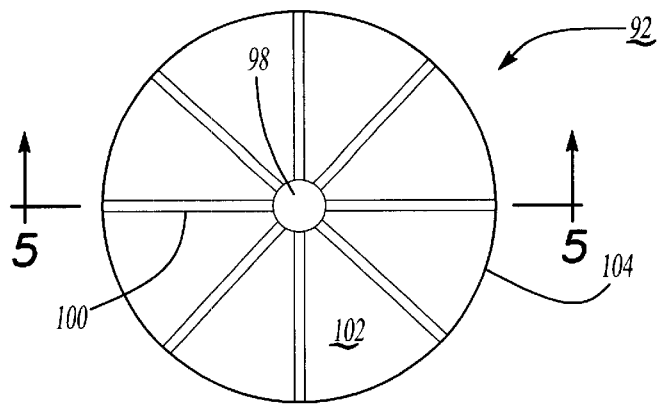
Fig-4
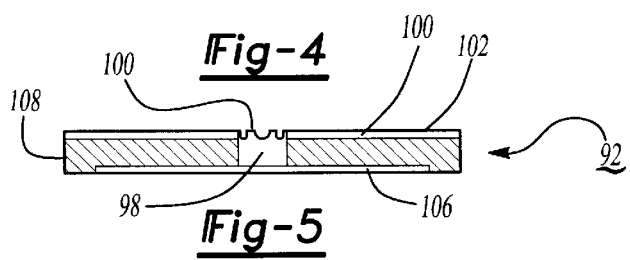
Fig-5
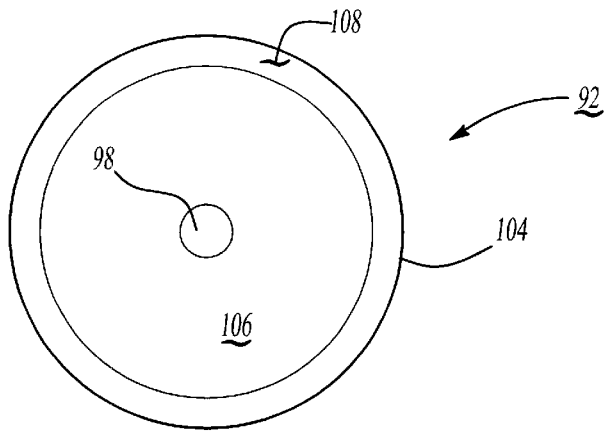
Fig-6
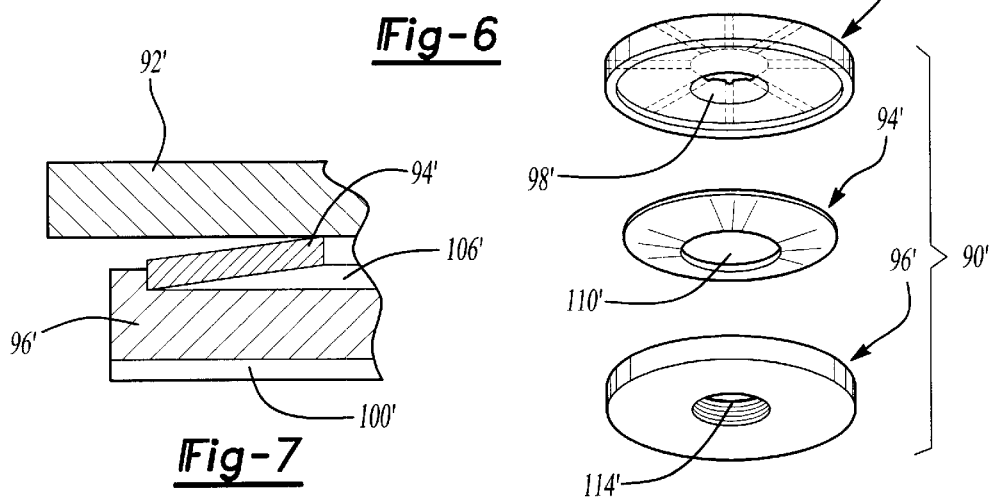
Fig-7
Fig-8

ANCHOR POST NON-ARTICULATING IDLER SOCKET JOINT

FIELD OF THE INVENTION

The present invention relates generally to socket joints, more particularly to socket joints that permit rotation of brackets and studs, but resist articulation.

BACKGROUND OF THE INVENTION

Non-articulating joints are applicable to a wide range of applications, including Pitman-idler arms used in steering linkages of automotive vehicles. Such joints typically include a cylindrical housing member adapted to receive a bearing together with a portion of a stud or bracket. The bearing reduces the amount of friction between the housing and the stud while frequently adapting for wear induced looseness between the stud and housing members.

Such joints have several disadvantages. Typically, the stud head or bracket end must be precisely machined to ensure an adequately tight joint. Further, the stud head or bracket end must be forced into the bearing. Even with such tolerances, some bearings may crack during assembly, particularly when very rigid, stiff, inelastic materials are used. To reduce cracking, heavier material is often used together with slots within the bearing itself. Load distribution in such slotted bearings typically results in undesired wear between the various components. Further, the bearings of such joints are adapted for only limited wear, resulting in joint failure as stud head rotating torque decreases and axial end play increases.

SUMMARY OF THE INVENTION

The present invention is directed to a non-articulating joint assembly that is easy to assemble and provides an extremely tight joint having no longitudinal or radial play, but still permits necessary rotation about a longitudinal axis. The joint assembly of the present invention also compensates for wear by having tapered split-half bearing members that permit easy assembly of the joint and axial and radial compression pre-loads. The joint assembly is applicable to a wide variety of applications, including Pitman-idler arms of steering linkages for automotive applications.

The joint assembly of the present invention includes a bracket having a generally cylindrical end portion and a second end having a bracket mounting portion. A socket member includes a housing with a bore therethrough. The bore being defined by a tapered inner wall surface, receives the bracket. In addition, a generally hollow, tapered split-half bearing assembly is positioned around the cylindrical end portion of the bracket with the tapered outside surface matingly contacting the tapered inner wall surface of the housing. The angle of taper for both the inner wall surface of the housing and the outer surface of the split-half bearings is preferably in the range of 1°–3°. Further, a pre-loaded cap bearing assembly, that includes a cap bearing, a spring member and a closure plate, is received in the housing and contacts a bottom surface of the split-half bearing assembly. Thus, the split-half bearing assembly is axially captured within the housing and the cap bearing assembly. It cooperates with the tapered split-half bearing members and tapered inner surface to pre-load the joint and prevent articulation. The closure member further serves to prevent dirt and debris from entering the joint assembly. A rim on the housing is crimped over to securely hold the joint assembly together. In addition, crimping produces an axial pre-load on the split-half bearing assembly. The split-half bearing assembly and the cap bearing of the present invention can further include a plurality of lubrication channels for re-lubricating the joint.

The axial and radial pre-loading in the present invention provides a greater range of tolerances in manufacturing the components. Increased tolerances result in reduced production costs and reduced scrap rates. The axial and radial compression pre-loads also maintain tightness in the joint assembly by compensating for wear. Further, the split-half bearing assembly permits quick and easy assembly of the joint without cracking problems.

The present invention also provides for a second housing having a second bore with a tapered inner wall surface located at an opposite end of the socket member. The second housing receives a stud having a threaded fastening portion at one end and a generally cylindrical end portion at an opposite end. The cylindrical end portion of the stud is received within a second split-half bearing assembly having a similar design to the first cap bearing, mentioned above. A second cap bearing assembly is also positioned to be adjacent split-half bearing assembly and the closure plate of the cap bearing assembly is captured by a portion of second housing that is crimped over to provide an axial and radial pre-load on the joint assembly.

Accordingly, the present invention provides a joint assembly having no longitudinal or radial end play and reduced production costs due to the use of increased manufacturing tolerances. Moreover, the joint assembly of the present invention has an increased service life by reducing unwanted end play.

BRIEF DESCRIPTION OF THE DRAWINGS

The features and inventive aspects of the present invention will become more apparent upon reading the following detailed description, claims, and drawings, of which the following is a brief description:

FIG. 4 is a top view of a first cap bearing according to the present invention.

FIG. 5 is a cross-sectional of the first cap bearing view taken along line 5—5 of FIG. 4.

FIG. 6 is a bottom view of the first cap bearing according to the present invention.

FIG. 7 is a partial cross-sectional view of a second cap bearing assembly for a second end of a non-articulating joint assembly according to the present invention.

FIG. 8 is an exploded view of the second cap bearing assembly of FIG. 7.

DETAILED DESCRIPTION OF PREFERRED EMBODIMENTS

Figure 1:
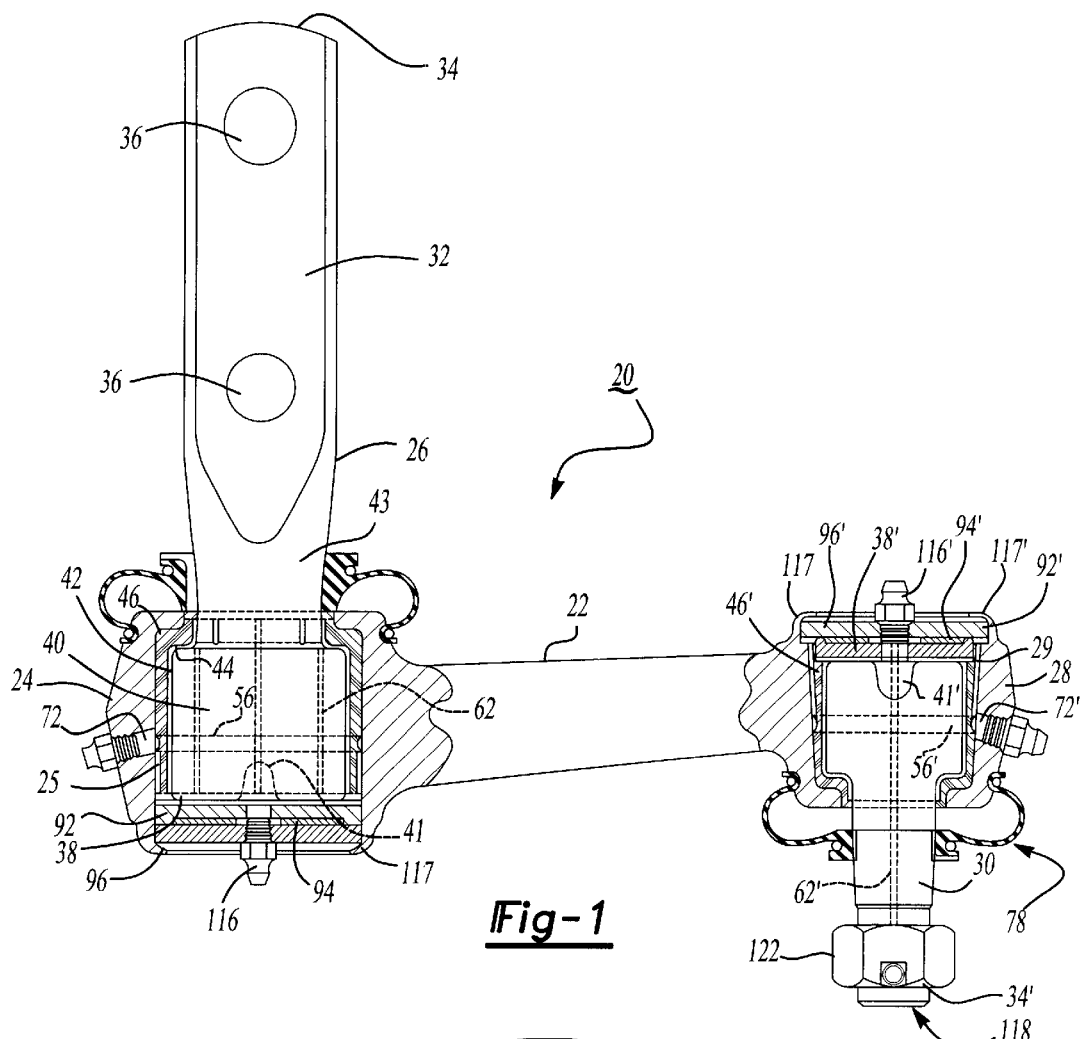
FIG. 1 is a partial cross-sectional view of a non-articulating joint assembly according to the present invention.
Figure 3:
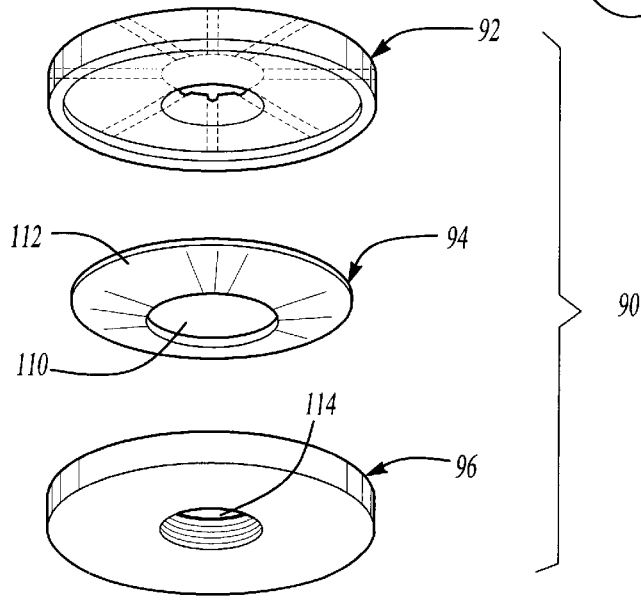
FIG. 3 is an exploded view of a first cap bearing assembly for a first end of a non-articulating joint assembly.
Figure 2:
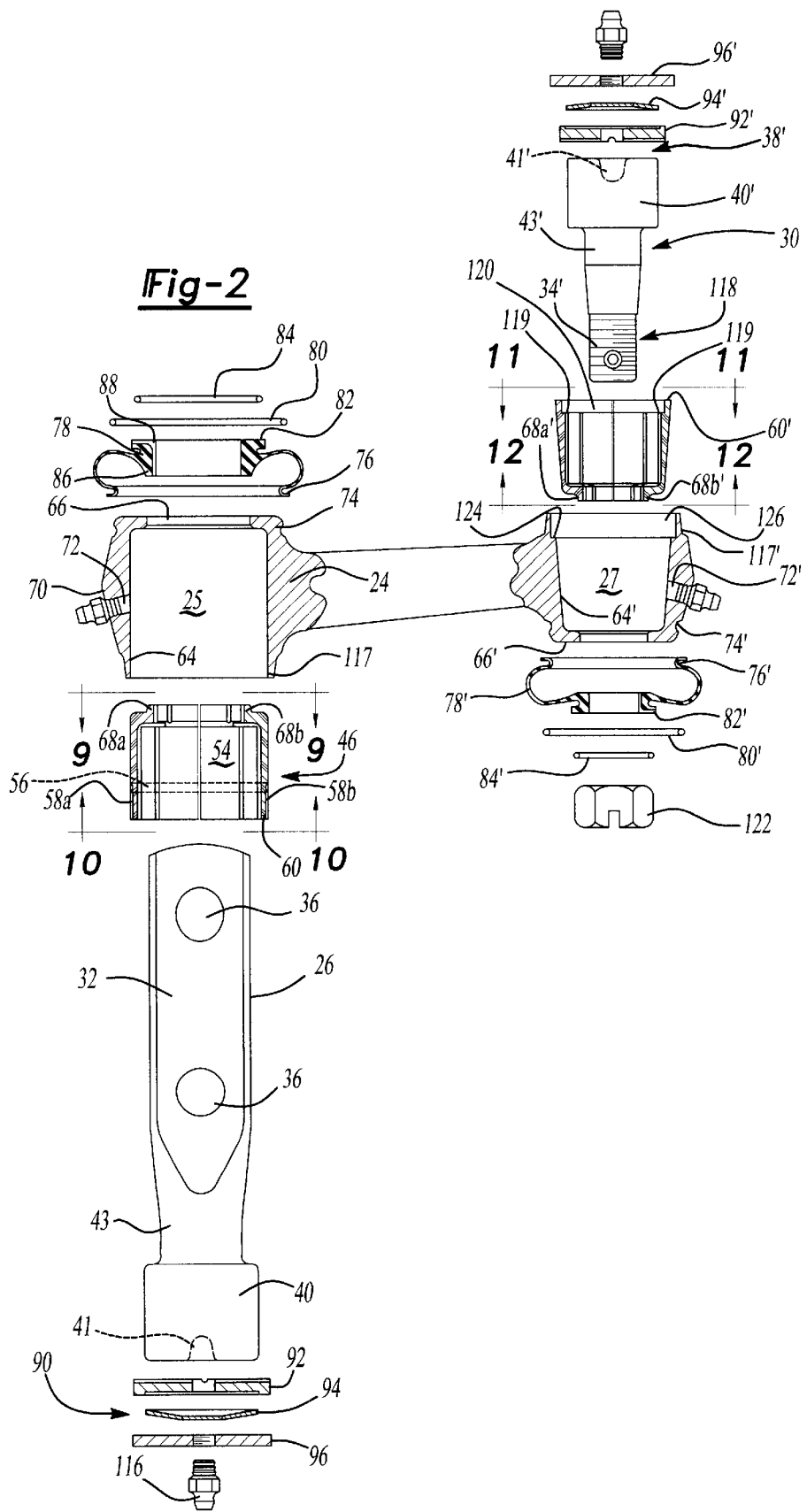
FIG. 2 is an exploded view of a non-articulating joint assembly.

FIGS. 1 and 2 show a non-articulating joint assembly 20 in accordance with the present invention. Joint 20 includes a generally metallic socket member 22 having a first housing 24 with a first bore 25 adjacent one distal end that receives a generally metallic bracket 26 shank member and a second housing 28 with a second bore 29 near a second distal end that receives a generally metallic stud 30 shank member.

Bracket 26 has a generally concave bracket mounting portion 32 that includes a first end 34 having a connecting portion that includes a number of openings 36 that allow attachment of bracket 26 using conventional fastening techniques. A second end 38 of bracket 26 is defined by a generally cylindrical end portion 40. Preferably, cylindrical end portion 40 is further provided with an optional lubricant well 41. A radially extending bearing mounting surface 42 is defined between bracket 26 and cylindrical end portion 40. A reduced neck portion 43 is located above mounting surface 42, on an opposite side from cylindrical end portion 40.

Figure 9:
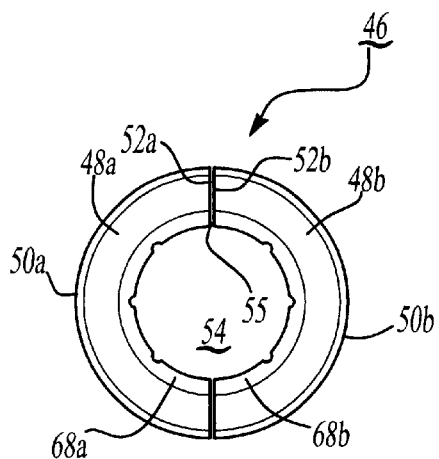
FIG. 9 is a top view of a first inner bearing assembly for a first end of a non-articulating joint assembly taken along lines 9—9 in FIG. 2.
Figure 10:
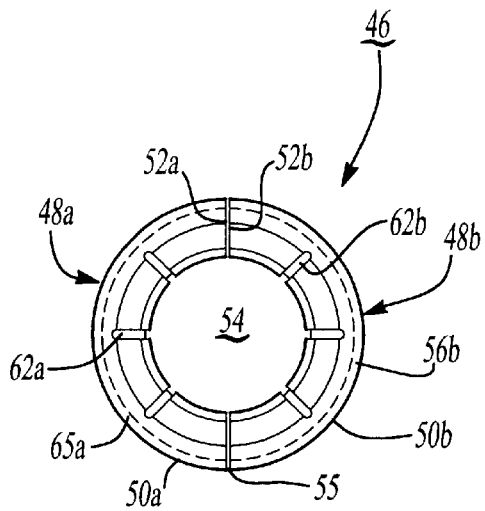
FIG. 10 is a bottom view of the first inner bearing assembly taken along lines 10—10 in FIG. 2.
Figure 11:
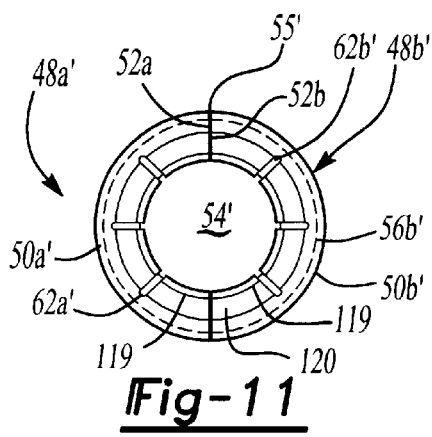
FIG. 11 is a top view of a second inner bearing assembly for a second end of a non-articulating joint assembly taken along lines 11—11 in FIG. 2.
Figure 12:
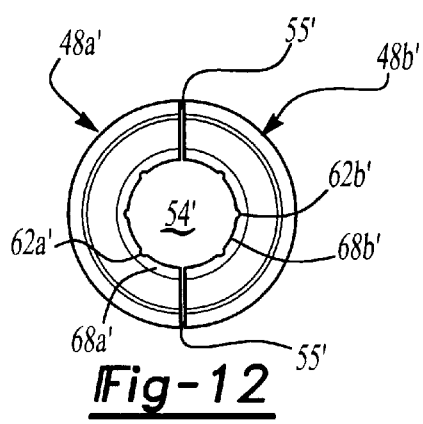
FIG. 12 is a bottom view of the second inner bearing assembly taken along lines 1–12 of FIG. 2.

Bearing mounting surface 42 contacts an interior annular surface 44 of a first inner bearing assembly 46. Referring to FIGS. 9–10, first inner bearing assembly 46 preferably includes mating split-half bearing members 48a and 48b. It is understood, however, that first inner bearing assembly 46 may include more than two mating bearing members. Outer surfaces 50a and 50b of split-half bearing members 48a and 48b are slightly tapered, preferably in the range of 1°–3°. Split-half bearing members 48a and 48b are substantially mirror images of one another and are arranged within first bore 25 in first housing 24 such that distal ends 52a of split-half bearing member 48a are in a face-to-face relationship with distal ends 52b split-half member 48b. An aperture 54 is defined by split-half bearing members 48a and 48b. Aperture 54 receives cylindrical end portion 40 of bracket 26, as will be explained in further detail below. Aperture 54 has an inner diameter that is slightly smaller than cylindrical end 40 of bracket 26, such that a gap 55 is formed when split-half bearing members 48a and 48b surround cylindrical end portion 40. Gap 55 is preferably in the range of 0.030"–0.090" to provide an adequately tight joint.

It is preferred that split-half-bearing members 48a and 48b further include a feeder lubrication channel 56 formed along bottom outer surfaces 50a and 50b to direct lubricant for joint 20 to transfer slots 58a and 58b. Transfer slots 58a and 58b extend upwardly from a bottom surface 60 and terminate at feeder lubrication channel 56. From transfer slots 58a and 58b, lubricant is transferred to lubrication grooves 62a and 62b. Lubrication grooves 62a and 62b extend the length of split-half bearing members 48a and 48b.

First inner bearing assembly 46 is received in first bore 25 of first housing 24. In accordance with one aspect of the invention, first bore 25 is defined by a tapered inner surface 64. The angle of taper of inner surface 64 of first bore 25 corresponds to the angle of taper of outer surfaces 50a and 50b. First bore 25 is sized to be slightly smaller than an outer diameter of first inner bearing assembly 46 to create a radial pre-load, when inner bearing assembly is forced into first bore 25.

First housing 24 further includes a throat portion 66 that receives upwardly extending top portions 68a and 68b of split-half bearing members 48a and 48b. Extending from an exterior surface 70 into first bore 25 is an external lubrication aperture 72. When inner bearing assembly 46 is positioned within first bore 25, external lubrication aperture 72 terminates at feeder lubrication channel 56, as best seen in FIG. 1.

Formed along a top portion of exterior surface 70 is a first groove 74, as best seen in FIG. 2. First groove 74 receives a sealing lip 76 of a first expandable dust boot 78. A wire clip 80 or other suitable device cooperates with first groove 74 to retain sealing lip 76 on first housing 24. A second sealing lip 82 is positioned around throat portion 43 of bracket 26. A second wire clip 84 or other suitable device cooperates to retain second sealing lip 82 on throat portion 43. Preferably, extending downwardly from second sealing lip 82, is a stop member 86 and a lubrication purge slot 88. Stop member 86 is utilized for maintaining seal position of first dust boot 78 around throat portion 43 and adjacent first housing 24. Stop member 86 has an inner diameter that substantially corresponds to an inner diameter of top portions 68a and 68b of split-half bearing members 48a and 48b. Lubrication purge slot 88 is formed through a top surface of second sealing lip 82 and extends through stop member 86 to selectively remove lubricant from lubrication grooves 62a and 62b.

Referring to FIGS. 3–6, joint 20 further includes a first cap bearing assembly 90 that is received in first housing 24. First cap bearing assembly 90 includes a first cap bearing 92, a spring member 94 and a closure plate 96. First cap bearing 92, as best seen in FIGS. 4–6, is sized to have an outer diameter that is substantially equal to the outer diameter of inner bearing assembly 46. First cap bearing 92 further includes a lubrication aperture 98 extending therethrough and a plurality of lubrication grooves 100 formed in a top surface 102 of cap bearing 92 and extending radially outwardly from lubrication aperture 98 to an outer perimeter 104 of first cap bearing 92. Lubrication aperture 98 is positioned substantially in the center of first cap bearing 92 and aligns with lubricant well 41 of cylindrical end portion 40 of bracket 26. A recess 106 is formed in a bottom surface 108 of cap bearing 92.

Spring member 94 is preferably a disc spring and serves to maintain axial pre-load on bracket 26 and bearings 46 and 92, to be explained in further detail below. Spring member 94 includes an aperture 110 therethrough that aligns with lubrication aperture 98 of cap bearing 92. Spring member further is defined by an upwardly extending periphery 112. Periphery 112 is positioned in recess 106 of cap bearing 92.

Closure plate 96 may be a sealing washer or other suitable member. Closure member 96 has an outer diameter substantially equal to the outer diameter of first cap bearing 92 and an aperture 114 therethrough that aligns with aperture 108 of spring member 94. Preferably aperture 114 is threaded to receive a washer zerk 116 or similar device to provide lubricant to joint 20.

To assemble joint 20, split-half bearing members 48a and 48b of first inner bearing assembly 46 are positioned around cylindrical end portion 40 with throat portion 43 of bracket 26 extending through the aperture formed by cooperating top portions 68a and 68b. Next, first inner bearing assembly 46 is press fit into first bore 25 of first housing 24 with top portions 68a and 68b of first inner bearing assembly 46 extending through throat portion 66 of first housing 24. Tapered outer surface 50a and 50b of split-half bearing members 48a and 48b cooperate with mating tapered inner wall 64 of first inner bore 25 to tightly retain cylindrical end portion within socket 22 and to subject cylindrical end portion 40 and first inner bearing assembly 46 to an axial preload. Accordingly, as wear occurs in joint 20, tapered first inner bearing assembly 46 will tend to remain in contact with tapered inner surface 64 of first bore 25 due to the radial pre-loading of first inner bearing assembly 46. Further, manufacturing tolerances can be relaxed because of the tapering design. As a result, reduced costs for manufacturing equipment and reduced scrap rates can be achieved.

Next, first cap bearing assembly 90 is then inserted into first bore 25 with top surface of cap bearing 92 engaging bottom surface 60 of first inner bearing assembly 46. Spring member 94, which is positioned in recess 106 of cap bearing 92, is compressed to be substantially planar, as best seen in FIG. 1, by closure plate 96. Closure plate 96 is next positively retained within first housing 24 by completely or partially crimping a lower rim 117. The crimping of lower rim 117 also produces an axial pre-load on closure plate 96, first cap bearing 92, cylindrical end portion 40 and first inner bearing assembly 46. Axial pre-loading produces a tight joint by eliminating looseness and placing first inner bearing assembly 46 in a state of axial compression. Further, the axial pre-load produced by inner bearing assembly 46 cooperating with cap bearing assembly 90 serves to permit rotation of the bracket, but resist articulation. Finally, first dust boot 78 is positioned on a top portion of first housing 24 with sealing lip 76 and wire clip 80 engaging groove 74 and sealing lip 82 engaging throat portion 43 of bracket 26.

A similar joint construction is shown involving stud 30, which is received in second housing 28. However, the orientation and size are different. Second housing 28 is illustrated as being generally smaller than first housing 24. Stub 30 is also generally smaller than bracket 26 and projects vertically downwardly as opposed to the vertical upward orientation of bracket 26. Similar features and components have been labeled with primed numbers to show their general correlation. Accordingly, unless otherwise described, the primed components share the same features as their non-primed counterparts.

Stub 30 has a first end 34' having a threaded connecting portion 118 and a second end 38' defined by a generally cylindrical end portion 40'. Cylindrical end portion 40' is received within second inner bearing assembly 46'. Second inner bearing assembly 46' is similar to first inner bearing assembly 46 and includes split-half bearing members 48a' and 48b' that cooperate to define an aperture 54' that receives cylindrical end portion 40'. Further, outer surfaces 50a' and 50b' are tapered, preferably within the range of 1°–3°. Tapered second inner bearing assembly 46' matingly engages a tapered inner surface 64' of a second bore 29 in second housing 28. Tapered inner surface 64' preferably has an angle of taper that corresponds to the angle of taper for second inner bearing assembly 46'. Tapered second inner bearing assembly 46' and tapered inner surface 64' cooperation to create a radial pre-load on second inner bearing assembly 46'. Unlike split-half bearing members 48a and 48b, each split-half bearing member 48a' and 48b' further includes an additional shoulder 119. Shoulder 119 is located adjacent to an upper surface 60' of second inner bearing assembly 46' and provides a recess 120 for receiving a cap bearing 92'.

A throat portion 43' of stub 30 is positioned in downwardly extending portions 68a' and 68b' of split-half bearing members 48a' and 48b', with second end 38' extending through second inner bearing assembly 46'. A nut 122 cooperates with threaded connection portion 118 to secure the position of stud 30. Extending portions 68a' and 68b' are positioned in a throat portion 66' of second housing 28.

Cap bearing 92' is positioned within recess 120 with a bottom surface 102' engaging shoulder 119 of second inner bearing assembly 46'. A top surface 108' of cap bearing 92' with a recess 106' receives a spring member 94'. Referring to FIGS. 7 and 8, a closure plate 96' is located above second cap bearing 92' and is mechanically retained by inwardly crimping at least a portion of an upper rim 117'. Crimping of upper rim 117' also cooperates with tapered second inner bearing assembly 46' and tapered inner surface 64' to produce an axial pre-load on the joint similar to the axial pre-load created by lower rim 117. Further, the axial pre-load produced by inner bearing assembly 46' cooperating with cap bearing assembly 90' serves to permit rotation of stud 30, but resist articulation.

One difference between first housing 24 and second housing 28 is an additional shoulder 124 provided in second housing 28. Shoulder 124 is located adjacent to upper rim 117' and provides a recess 126 that allows a relatively large diameter closure plate 96' to be used. In addition, a large diameter upper rim 117' reduces the amount of push out stress on crimped over portions of rim 117'.

Preferred embodiments of the present invention have been disclosed. A person of ordinary skill in the art would realize, however, that certain modifications would come within the teachings of this invention. For example, therefore, the following claims should be studied to determine the true scope and content of the invention.

What is claimed is:

1. A non-articulating joint assembly comprising:

a shank member having a generally cylindrical end and a connecting portion end;

a socket member including a first housing having a first bore, wherein said first bore is defined by a tapered inner wall surface;

a cup-like inner bearing assembly having at least two mating split bearing members that substantially surround said cylindrical end of said shank member; said split bearing members having a tapered outer surface that matingly contacts said tapered inner wall surface of said first housing bore;

a pre-loaded cap bearing assembly received in said first housing for exerting a predetermined axial preload on said inner bearing assembly and said cylindrical end of said shank member; said inner wall surface of said socket and said tapered outer surface of said inner bearing assembly cooperating with said cap bearing assembly to permit rotation of said shank member but resist articulation;

wherein said cap bearing assembly includes an inner bearing, a spring member and a closure plate and wherein said inner bearing includes a top surface having at least one lubrication channel formed thereon and a bottom surface.

2. The joint assembly of claim 1, wherein said bottom surface has a recess formed therein for receiving said spring member.

3. The joint assembly of claim 1, wherein said tapered inner wall surface of said socket bore is tapered to a predetermined angle that corresponds to a predetermined angle of taper for said split bearing members.

4. The joint assembly of claim 3, wherein said predetermined angle is within the range of 1°–3°.

5. The joint assembly of claim 1, wherein said split bearing members are separated by a gap in the range of 0.030"–0.090".

6. The joint assembly of claim 1, wherein said split bearing members have a plurality of lubrication channels for effectively distributing lubricant to an interface between said tapered split bearing members and said tapered inner surface of said first housing.

7. The joint assembly of claim 1, wherein said first housing further includes an external lubrication aperture extending through an outer surface of said first housing and into said bore.

8. The joint assembly of claim 1, further comprising a groove on said housing for receiving a portion of a dust boot held in said groove by a clip member, said boot providing a seal between said first housing and bracket.

9. The joint assembly of claim 8, wherein said dust boot further includes a lubricant purge slot extending from an interior of said dust boot to a distal end of said dust boot away from said first housing.

10. The joint assembly of claim 1, wherein said socket member further comprises:

a second housing and a second bore, wherein said second housing and said second bore is smaller than said first housing and first bore, said second bore defined by a tapered inner wall surface;

a second shank member having a first end defined by a generally cylindrical end and a connecting portion;

a second cup-like inner bearing assembly including a second set of mating split bearing members that substantially surround said cylindrical end of said second shank member; said second split bearing members having a tapered outer surface that matingly contacts said tapered inner wall surface of said second housing bore;

a second preloaded cap bearing assembly received in said second housing for exerting a predetermined axial preload on said inner bearing assembly and said cylindrical end of said second shank; said inner wall surface of said second housing and said tapered outer surface of said second inner bearing assembly cooperating with said second cap bearing assembly to permit rotation of said second shank and resist articulation.

11. The joint assembly of claim 10, wherein said tapered inner wall surface of said second housing bore is tapered to a predetermined angle that corresponds to a predetermined angle of taper for said second set of said split bearing members.

12. The joint assembly of claim 11, wherein said predetermined angle is within the range of 1°–3°.

13. The joint assembly of claim 10, wherein said second set of split bearing members are each separated by a gap in the range of 0.030"–0.090".

14. A non-articulating joint assembly comprising:

a bracket having a generally cylindrical end and a bracket mounting portion end;

a socket member including a first housing having a first bore, wherein said first bore is defined by a tapered inner wall surface;

a cup-like inner bearing assembly including mating split-half bearings that substantially surround said cylindrical end; said split-half bearings having a tapered outer surface for mating contact with said tapered inner wall surface of said housing bore;

a pre-loaded cap bearing received in said socket member for exerting a predetermined axial preload on said inner bearing assembly and said first end; said cap bearing further including a recess formed in a bottom surface thereof for receiving a spring member;

a closure plate being positioned below said cap bearing so as to capture said spring member between said closure plate and said cap bearing;

wherein a lower rim of said housing is at least partially deformable to surround said closure plate; and said inner wall surface of said socket member and said tapered outer surface of said inner bearing assembly cooperating with said cap bearing, spring member and closure plate to permit rotation of said bracket and resist articulation of said bracket.

15. The joint assembly of claim 14, wherein said first end of said bracket has a diameter that is slightly larger than a diameter formed by said split-half bearings to provide a radial pre-load on said split-half bearings and eliminate radial looseness in said joint assembly.

16. The joint assembly of claim 14, wherein said split-half bearings have a plurality of lubrication channels for effectively distributing lubricant to an interface between said bracket and an inner surface of said split-half bearings.

17. The joint assembly of claim 14, wherein said socket member further comprises:

a second housing and a second bore, wherein said second housing and said second bore is smaller than said first housing and first bore; said second bore defined by a tapered inner wall surface;

a stud having a first end defined by a generally cylindrical first end and a second end defined by a threaded connecting portion;

a second cup-like inner bearing assembly including a second set of split-half bearings that substantially surround said first end of said stud; said second split-half bearings having a tapered outer surface for mating contact with said tapered inner wall surface of said second housing bore;

a second preloaded cap bearing received in said socket member for exerting a predetermined axial preload on said second inner bearing assembly and said first end of said stud; said second cap bearing further including a recess formed in a bottom surface thereof for receiving a second spring member;

a second closure plate being positioned below said second cap bearing so as to capture said second spring member between said second closure plate and said second cap bearing; and wherein a lower rim of said second housing is at least partially deformable to surround said second closure plate; said inner wall surface of said second housing and said tapered outer surface of said second inner bearing assembly cooperating with said second cap bearing, second spring member and second closure plate to permit rotation of said stud and resist articulation of said stud.

* * * * *